(No Model.) 6 Sheets—Sheet 2.

G. D. RAND & J. A. KOLLMYER.
STEAM PUMP.

No. 465,050. Patented Dec. 15, 1891.

WITNESSES:
T. J. Hogan.
F. E. Gaither.

INVENTOR,
George D. Rand,
John A. Kollmyer,
by George H. Christy
Att'y (No Model.) 6 Sheets—Sheet 3.

G. D. RAND & J. A. KOLLMYER.
STEAM PUMP.

No. 465,050. Patented Dec. 15, 1891.

(No Model.) 6 Sheets—Sheet 4.

G. D. RAND & J. A. KOLLMYER.
STEAM PUMP.

No. 465,050. Patented Dec. 15, 1891.

WITNESSES:
T. J. Hogan.
F. E. Gaither.

INVENTOR,
George D. Rand,
John A. Kollmyer
by George H. Christy
Att'y.

(No Model.) 6 Sheets—Sheet 5.

G. D. RAND & J. A. KOLLMYER.
STEAM PUMP.

No. 465,050. Patented Dec. 15, 1891.

WITNESSES:
T. J. Hogan.
F. E. Gaither.

INVENTOR,
George D. Rand,
John A. Kollmyer,
by George H. Christy
Att'y.

THE NORRIS PETERS CO., PHOTO-LITHO., WASHINGTON, D. C.

(No Model.) 6 Sheets—Sheet 6.

G. D. RAND & J. A. KOLLMYER.
STEAM PUMP.

No. 465,050. Patented Dec. 15, 1891.

WITNESSES: INVENTOR,

UNITED STATES PATENT OFFICE.

GEORGE D. RAND AND JOHN A. KOLLMYER, OF KEOKUK, IOWA.

STEAM-PUMP.

SPECIFICATION forming part of Letters Patent No. 465,050, dated December 15, 1891.

Application filed May 29, 1891. Serial No. 394,512. (No model.)

*To all whom it may concern:*

Be it known that we, GEORGE D. RAND and JOHN A. KOLLMYER, citizens of the United States, residing at Keokuk, in the county of Lee and State of Iowa, have invented or discovered a certain new and useful Improvement in Steam-Pumps, of which improvement the following is a specification.

The present invention relates, in a general way, to certain improvements in steam-pumps of the kind or class illustrated in Letters Patent No. 406,098, to Edward C. Johnson, dated July 2, 1889, sometimes called "cycloidal" or "gyratory" pumps, the latter, perhaps, being the preferable term.

The particular objects we have in view are, first, to regulate the counterbalance of upwardly and downwardly acting forces operative on the gyratory steam-piston at different points on its upper exposed surface; second, to do the like work as regards the water-piston, and, in the third place, by other minor features of construction to improve the efficiency and operativeness of the pump.

In the drawings hereto annexed in six sheets, Fig. 2, Sheet 2, is a top or plan view of the lower body portion or cylinder and with the steam-piston and water-piston shown in position at what may be termed the "beginning" of the piston stroke or motion. Figs. 2 to 5 are made to the same scale, but to a slightly-smaller scale than Fig. 1. The detail sections of Figs. $2^a$ and $2^b$ on Sheet 2, made, respectively, on the lines $z$ and $y$, are enlarged slightly and approximately to the scale of Fig. 1.

In any suitable pedestal, foundation, or supporting-base we make a water-supply port or passage 100, which, by a suitable port 2, opens into the annular water chamber or cylinder 3. In the same foundation or pedestal we make the water exit or discharge passage 101, into and out of which the water is ejected or forced from the cylinder 3, passing in so doing through the port 4. The pedestal or foundation 102 also furnishes the foundation or support for the mechanisms employed, and has a partition 103, by which to separate the inlet and outlet passages 100 and 101. In other respects it may be made in any desired way.

The annular steam-cylinder is represented at 8, and in it is the annular steam-piston A. The latter is made as a part of or is fixedly connected with an annular cap or plate 6, preferably stiffened on its upper side by means of a ring 7. This piston-plate 6 is made broad enough, for purposes presently to be explained, so as to overlap on both sides the walls of the annular steam-cylinder 8, in which the annular ring-piston A operates by a sort of gyratory motion, as presently to be explained. The opposite edges of the piston-plate 6 may be considered in one aspect of the case simply as flanges, which project from opposite sides of the upper edge of the steam-piston A, and these act as counterbalancing-flanges or as a counterbalancing-plate in their relationship to the piston A and at the same time perform the function of carrying the piston as well as of transmitting its motion to the water-piston. A circular opening is made at the middle of this piston-plate 6, immediately over the water-cylinder 3. An annular water-piston B is arranged in the water-cylinder 3, and is made as a part of or is rigidly connected with a circular water-piston plate 10, which fits with a good degree of accuracy in the circular hole made in the piston-plate 6. The water-piston B has the proper gyratory motion for taking in water at the port 2 and forcing it out at the port 4, substantially in the manner described in the Johnson patent above referred to. Around the central opening in which the water-piston plate 10 is thus placed we make on the piston-plate 6 a raised flange 1, and over this we place the inverted or downwardly-flanged cap 13, which goes on somewhat like the lid of a blacking-box, but with an interposed spring-packing, as at 5. The cap 13 is secured to the water-piston plate 10, and the latter to the steam-piston 6 in any suitable way, as by dowel-pins 15, by bolts or otherwise, in such manner that any motion imparted to the piston-plate 6 shall be transmitted to, or a like motion given to, the water-piston 10.

The whole device or mechanism thus described is covered by any suitable top plate or plates 16 17, made in one, two, or more pieces and secured in place by bolts or other suitable known means.

Steam for the purpose of operating the pump is admitted at any suitable steam-port 18, so that, entering steam-cylinder 8, it may become operative on the annular ring-piston A, as presently to be described. Of course it will at the same time exert an upward pressure on the under side of the piston-plate 6, which covers the annular cylinder 8, and will thereby tend to lift such plate, and with it the piston A, out of working position; also, the resistance or back-pressure produced by the water in the water-cylinder 3, being operative on the under side of the water-piston plate 10, will tend to lift such plate, and with it the water-piston B, out of working position. To counterbalance these upwardly-acting forces, steam is allowed to pass through any suitable port 19 into the open space under the cover-plates 16 and 17, so that, acting downwardly on top of the working mechanisms, it shall counterbalance the upwardly-acting forces referred to. Of course, and for reasons well understood in the art, the aggregate downward pressure should be somewhat in excess of the aggregate upward pressure. All this is provided for in a general way in the Johnson patent above referred to, though the devices employed are not in all respects the same.

Figure 1:
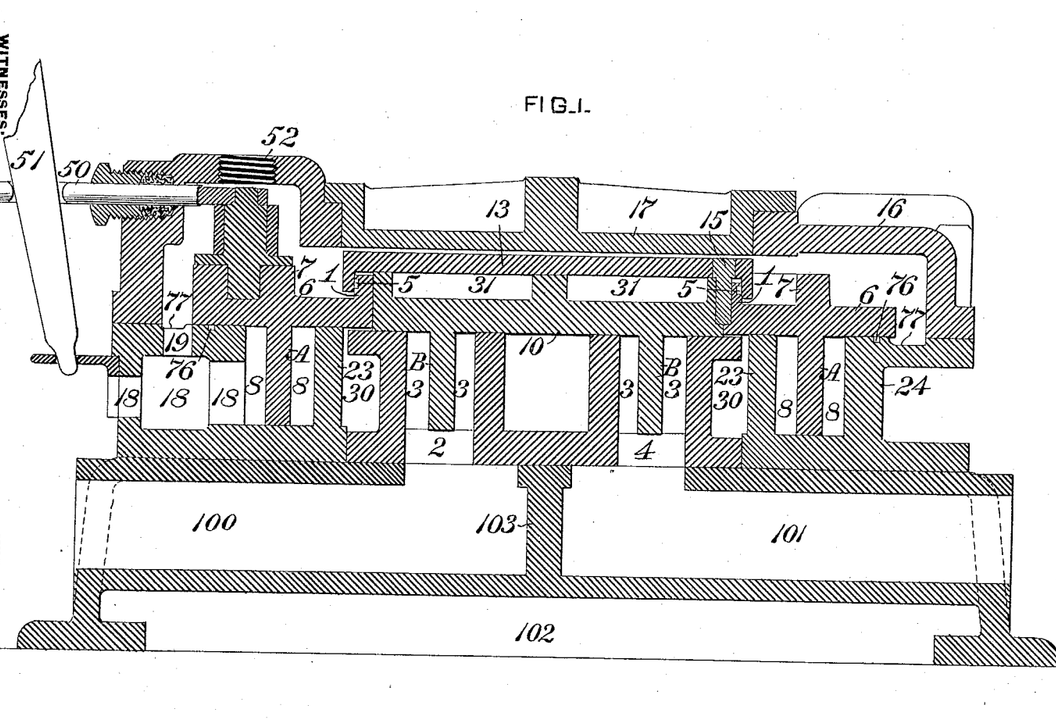
Figure 1 is a transverse vertical section through the axis of the pump.
Figures 2, 2A, 2B:
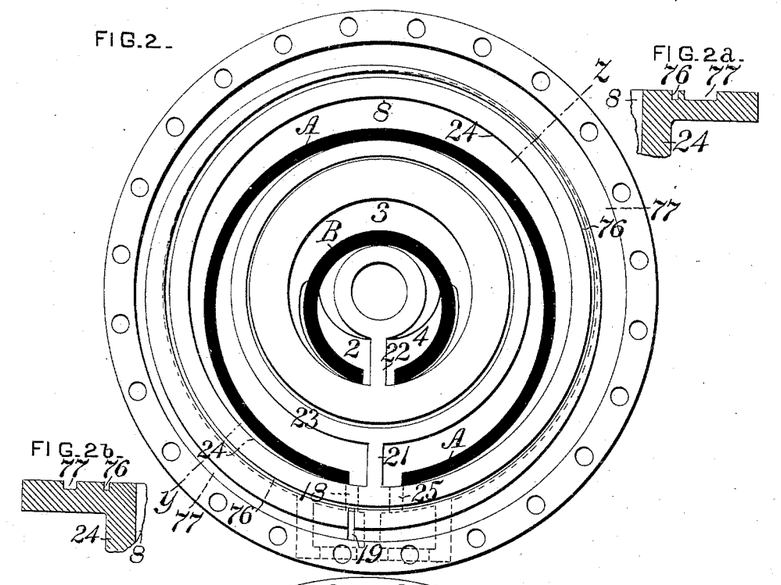
Figure 3:
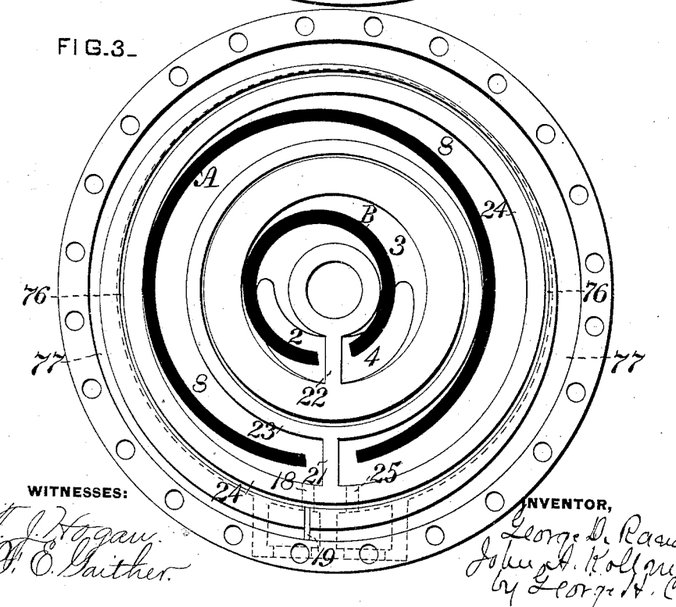
Fig. 3 is a similar view, but showing the position of the same devices at the first quarter-stroke.
Figure 4:
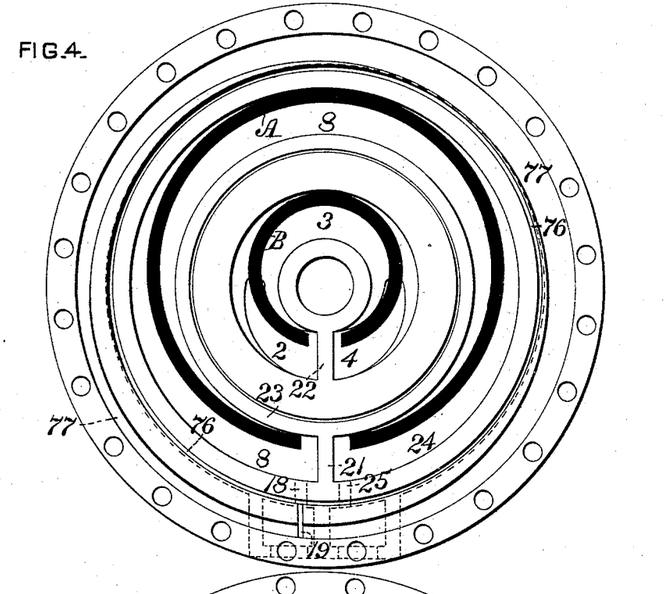
Fig. 4, Sheet 3, is a like view illustrating the position of the devices at the half-stroke.
Figure 5:
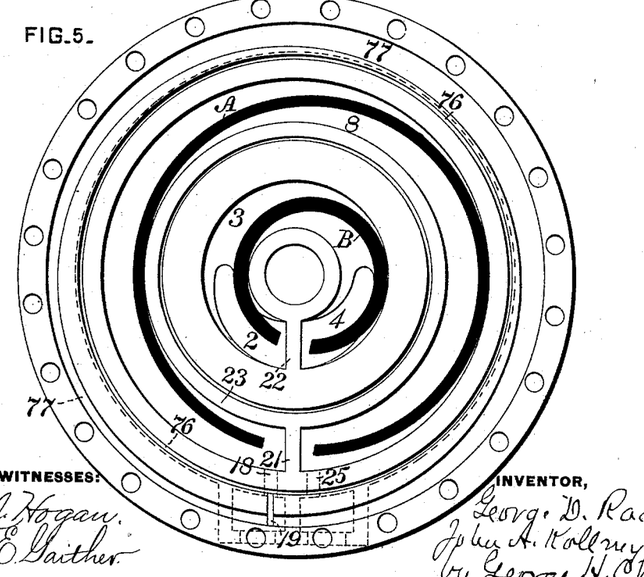
Fig. 5 shows the position of the same devices at the three-quarter stroke.
Figure 6:
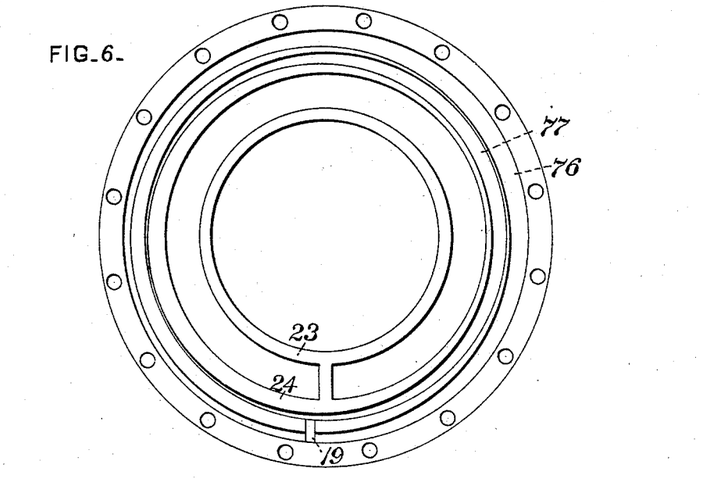
Figs. 6 to 9, Sheet 4, represent modifications hereinafter to be described, but to a somewhat smaller scale.

In Figs. 2 to 5 we have illustrated the working positions of the steam and water pistons. These also are found in the Johnson apparatus; but a brief explanation of the same is necessary to an understanding of our invention. The annular steam-cylinder 8 is divided or cut across by the diaphragm 21, and the water cylinder or chamber 3 by the diaphragm 22, both substantially as provided by Johnson; but instead of providing steam-ports through the ends of the steam-piston A, as provided for by Johnson, we prefer to cut away the ends of the rings a little, so that the steam in entering the cylinder or chamber 8, as well as in exhausting from it, will pass between the ends of such rings and the abutment 21. It will readily be seen, commencing with the devices shown in the position in Fig. 2, that live steam entering at the port 18 will first pass inside the steam-piston A, and, acting between it and the inner wall 23 of the chamber 8, will gradually move said ring, and with it the steam-piston plate 6, over to the position illustrated in Fig. 3, which may be termed the "quarter-stroke" position. While this has been going on it will be seen that the open ends of the piston A have been moving away from the outer wall 24 of the chamber 8, so as to allow live steam to pass outside of said piston. Live steam now continuing to act both inside and outside of the piston A, the devices will be shifted to the position illustrated in Fig. 4, which may be termed the "half-stroke" position. The open ends of the piston A having now come in contact with the inner wall 23 of the chamber 8, all the steam inclosed between such piston A and the inner wall 23 must act only expansively, and, in fact, less and less so, as the gyratory motion continuing the piston A is brought around to the position illustrated in Fig. 5, at which point steam is being exhausted from inside the ring-piston past its free end and out at the exhaust-port 25. From this description it will be seen that through all or the greater part of the first half of the piston stroke or motion live steam is operative as live steam on the under side of the steam-piston plate 6, and consequently tends to lift such plate on what in the drawings is represented, Figs. 2 to 5, as the left-hand side or half of the pump, with the greatest possible force; but it will also be seen that through the residue or latter half of the piston stroke or motion there is but very little live-steam action; or, more accurately speaking, on that part of the ring-piston which acts through the right-hand half of the pump live steam is operative to but a very small extent. The steam action here involved is chiefly and for the most part the expansive force of steam after the supply has been cut off, and so continues until near the end of the stroke or motion, when the exhaust-port is opened and the steam-pressure becomes still less. Consequently through approximately the whole of the movement effected in the right-hand half or section of the pump the steam is acting with its least efficiency or pressure, or with a less efficiency or pressure than on the other side or half. Hence the upward pressures which have to be counterbalanced are greater on the live-steam side of the pump than on the exhaust-steam side. The first point of our invention is directed to making a proper counterbalance to this variable upward pressure. The downward pressure is practically constant and also is practically uniform over the entire upper area of the moving mechanism. Hence to make the counterbalance uniform—that is, so that the difference between upward and downward pressures shall be practically or approximately the same throughout (we refer now to the steam-piston only)

we vary the area of surface exposed to upward pressure in what may be termed the "packing-grooves"—that is to say, we provide one or more packing-grooves in the upper or working surface of the exterior wall 24 of the steam-cylinder 8—and we vary the area or cross-section of such packing-grooves, so that, say, on the right-hand side of the pump, or where the upward pressure of the steam is least, a broader groove or larger area of packing-surface accessible to steam-pressure shall supplement or add to the upward pressure of the steam in the cylinder to such extent that the two pressures—that is, the cylinder-pressure and the packing-groove pressure—shall be approximately equal to the upward live-steam-cylinder pressure on the other side. The arrangement and construction of these grooves is illustrated in Figs. 1 to 5; but for greater clearness herein we have shown sectional views thereof by separate figures in Figs. 2$^a$ and 2$^b$, Sheet 2, the former being a section on the line $z$ and the latter on the line $y$. As thus illustrated we provide two packing-grooves, of which the inner one 76 we have represented to be of uniform size in cross-section at all points simply for general purposes of packing, and which consequently does not constitute a necessary part of the invention now in question. The other groove 77, however, has this for its express purpose. It will be observed that it is narrowest at or near that part of its circumference where the live steam is acting with greatest effect, as shown in Fig. 2$^b$. At this point it may be made smaller yet, and in fact wholly disappear. As illustrated in Fig. 2$^a$, this groove 77 is made broadest or of the greatest area at or approximately at that point at which the steam is operating with its least efficiency. Between these two points the groove area may be varied at pleasure; but for ordinary purposes we regard it as best to make it tapering or with a regularly-progressive increase from one to the other. Of course some portion of this groove should always be open to the steam-pressure, or at least sufficiently so to secure the proper steam-pressure therein, or else one or more small steam-supply ports should lead thereto. It will now be seen that for practical purposes the steam-piston plate 6 on the side on which ordinary steam-pressure is least will be subject to an upward steam-pressure in the groove 77 greater than in the same groove on the opposite side, and that by a proper proportioning of such groove the deficiency in upwardly-acting steam-pressure on that side of the cylinder where it is least will be supplemented by the excess of upwardly-acting steam-pressure in the broader parts of the groove 77; or as another way of saying the same thing, so much of the plate 6 as is in operation overlaps the groove 77 is equally balanced above and below, and consequently there is so much the less of area subject to dominant downward pressure on the right-hand side of the pump, or through that part of its operation where the steam in the cylinder operates least efficiently. As a result of this we attain approximately a uniform difference between upward and downward pressures at all points around the steam cylinder and piston. As this part of our invention depends on the variability of area subject to steam-pressure in the working faces of the wall 24 and of the piston-plate 6, it will be seen that the groove 77, instead of being made in the outer part of the wall 24, may be made near its inner edge, as illustrated in Fig. 6, and it is also true that both the grooves may be varied in transverse area, in accordance with the rules and for the purposes above stated, and such modification is also illustrated in Fig. 6; also, such variable groove may be made in the lower face of the piston-plate itself, as illustrated in Fig. 7, and at any desirable point on the lower working face of said plate where it may perform the function described.

The next part of our invention relates to doing the same work—that is, of securing a practically uniform counterbalance on all sides of the water-piston—for it will be seen that as the water is taken in at the port 2 and forced out at the port 4 the resistance, or, in other words, the upward pressure on the under side of the plate 10, will be much the greatest on the right-hand or delivery side of the pump ("right" and "left," being used with reference to Figs. 2 and 5) than on the left hand. We do not think it necessary to explain this in greater detail, as we think it will be obvious to those skilled in hydraulics from an inspection of the drawings, especially if it be remembered that the water-piston ring B necessarily has imparted to it exactly the same motions as those which belong to the steam ring-piston A, and that such motions will necessarily result in taking in water by the port 2 and forcing it out by the port 4.

Figure 10:
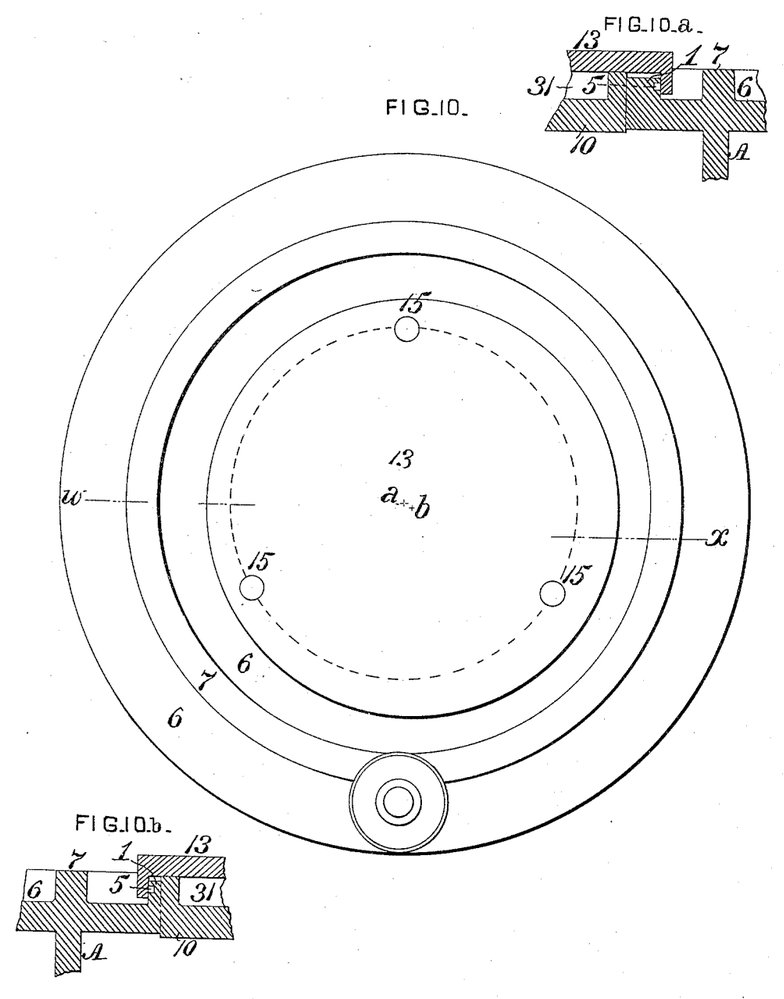
Fig. 10, Sheet 5, is a top or plan view of the steam-piston plate and of the cap which covers the water-piston plate, and made with particular reference to illustrating the eccentricity of the cap. Figs. $10^a$ and $10^b$ on the same sheet are sectional views, respectively, through the joints made by cap and flange in the vertical planes of the lines $x$ and $w$. The scale of Figs. $10^a$ and $10^b$ is approximately that of Fig. 1.
Figure 11:
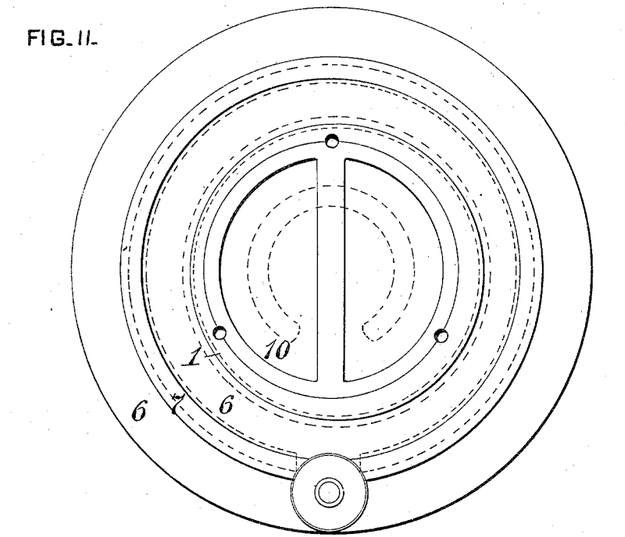
Fig. 11, Sheet 6, is a top or plan view, but to a smaller scale, of the steam-piston plate and of the water-piston plate.
Figure 12:
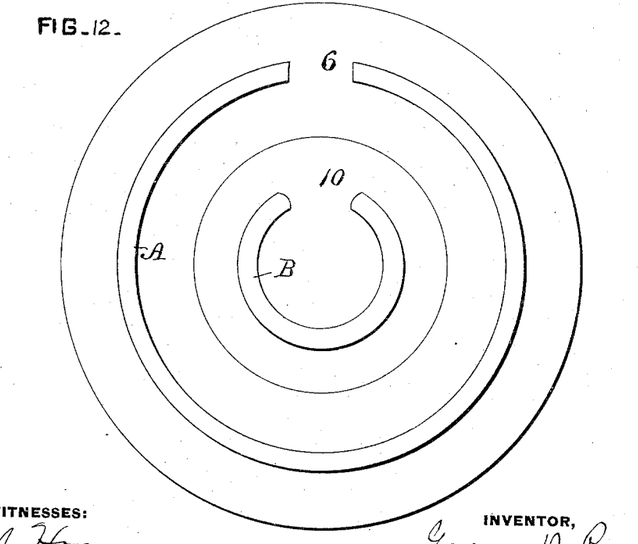
Fig. 12 is an inverted view of the same two plates and showing the pistons on the under side.

In order now to secure a uniform counterbalance all around on the water-piston, we make the cap 13 a little eccentric—that is to say, a little fuller or larger over that part of the piston where the upward water-pressure is the greatest. This we have represented more particularly in Fig. 10, Sheet 5, where $a$ represents the center of the opening, (shown by dotted lines,) in which the plate 10, Fig. 1, is inserted, and $b$ represents the center of the top face of the cap itself. As already stated, the upwardly-projecting flange 1, which surrounds the opening in the plate 6, in which latter we put the plate 10, is made broader on the exhaust or delivery side of the water-chamber, as represented in Fig. 10$^a$, than it is on the other side, as represented in Fig. 10$^b$; but for convenience of construction the outer periphery of this flange is made circular, but from a different center from that of the opening in the plate 6, or rather eccentric to such opening, but so that the fullest side, or the side or area of the cap 13 which shall be the larger, shall be over the chamber 3 on the delivery side. Consequently the downward steam-pressure on that side will be the greater, because on such side there will be a larger area subject to downward steam-pressure. Hence we have the greater steam-pressure acting against the greater water-pressure on the delivery side of the water-cylinder, and a lesser downward steam-pressure acting against the lesser upward water-pressure on the receiving side of the water-cylinder. The rules governing the amount of eccentricity to be given to the top plate 13 are well understood by hydraulic engineers in view of the proportions of parts and steam and water pressures to be dealt with. It should also be noted in this connection that the eccentricity of the plate 13 being on the side or having its full side toward that part or side of the pump on which steam-pressure in the steam-cylinder operates with the least efficiency, as already explained, such eccentricity, to the extent or amount of it, lessens the area of surface in the plate 6, which otherwise would be subject to downward steam-pressure on the right-hand side of the pump, and consequently to that extent aids in securing the proper counterbalance of steam-pressures already referred to. Hence while the counterbalance of steam-pressures on the plate 6 may be regulated in the manner already described it is also true that such counterbalance or the regulation thereof may be effected in part by means of the eccentricity of the piston-plate 13, as thus stated.

Figures 7, 8, 9:
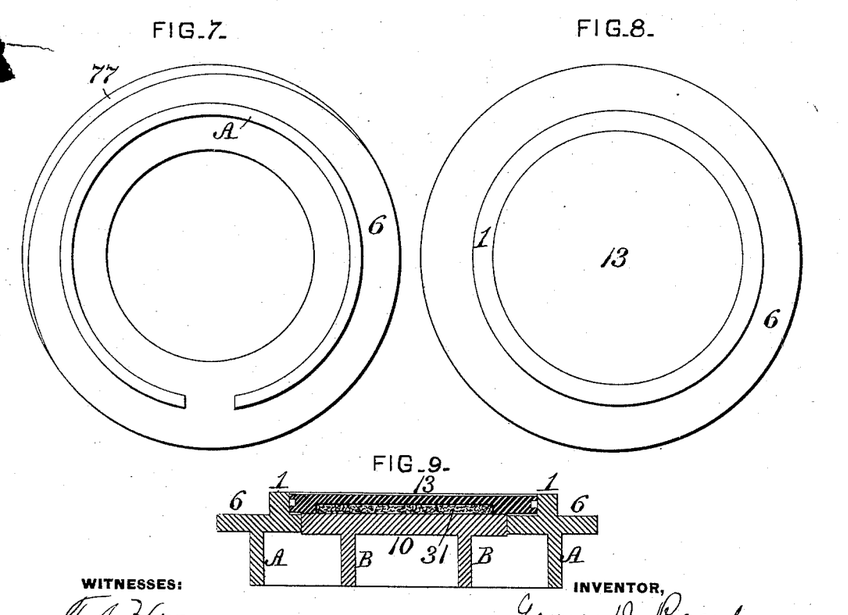

The cap 13, instead of being of cap form or construction, may, while retaining its eccentricity, be made of piston form or construction, as illustrated in Figs. 8 and 9; but in this case the flange 1, raised on the piston-plate 6, should be eccentric as regards the opening in the plate 6, in which the plate 10 is inserted. This is given merely as one possible modification.

As regards the grooves 76 and 77, or such of them as may be made of different widths at different points, the introduction of them amounts, simply, to varying the areas of working surfaces as between the piston-plate 6 and the walls or abutments on which it rests and operates, or, in other words, the cutting away of certain parts of one or the other of such working faces, so that the area of contact working faces as between plate and abutment shall be greater on the side or at the part at or near which live steam is admitted than it is on the side or part at which the steam is working only or for the most part expansively.

In pumps of this class it is highly important to guard against excessive condensation of steam. To this end the chambers 30 are provided between the cylinders 3 and 8 and may be packed in any suitable way; but as to this feature we make no claim; but we have made a further improvement in this direction by making one or more chambers 31 in the top of the removable water-piston plate 10, or between it and its cap 13. This space we fill with asbestus or other suitable non-conducting material, in order more perfectly to guard against the cooling or condensation of the steam through the influence of the water in the chamber 3, and we have also found that the operation of the apparatus is improved somewhat in consequence of the introduction and use of a telescopic joint by which to connect the cap 13 with the plate 6. This is illustrated in Figs. 1, 10$^a$, and 10$^b$, where the flange on the cap 13 is shown as slipping down over the flange 1, which is raised around the opening in the plate 6. A spring packing-ring is put in to complete the joint, and a joint of like character is shown in connection with the modification of Fig. 9.

In Fig. 1, 50 represents a starting-bar operated by a lever 51, and the purpose of which is, by taking hold with the wrist and link connection, to provide means for shifting the plate 6, so that the pump will readily be started. The hole 52 may be closed by a screw-plug or lubricator, or otherwise, at pleasure.

In a general way it may be stated that in the preferred construction of this pump the proportions of one to four have been found thus far most advantageous as between the vertical depth of the steam-cylinder and the diameter of its counterbalancing-plate; but we do not limit ourselves to these proportions, as they may be varied at pleasure; also, as regards other features of construction generally and the combinations made thereby, we do not limit ourselves to exact details nor proportions; but, claiming the benefit of the doctrine of mechanical equivalents, we include herein as of our invention all combinations substantially the same in view of the work performed and the manner of performing it.

It will be understood that an advantageous result in the construction of pumps of this class will be attained by the use of the counterbalancing mechanism described as applied to the steam-piston plate only, so that in connection therewith a separate or special counterbalance of the water-piston, such as we have described, may not in all cases be absolutely necessary. In other words, the eccentricity by means of which counterbalancing is secured in the water-piston may, if so desired, be omitted and any known suitable appliances for connecting the water-piston with the steam-piston plate may be substituted.

We claim herein as our invention—

1. The combination of the top plate of a gyratory piston and the annular wall or abutment on which it operates, said plate and abutment having between them an area of contact working surfaces greater on the side or part at or near which live steam is admitted than it is on the side or part at which the steam is working only or for the most part expansively, substantially as set forth.

2. The combination of the top plate of a gyratory piston and the annular wall or abutment on which it operates, said plate and abutment having between them an area of contact working surfaces which decreases in transverse measurement in any desired ratio from at or near the point where the steam acts most efficiently as live steam to or toward the point where it acts chiefly by expansion, substantially as set forth.

3. In combination with a gyratory steam-piston plate having a central opening for the insertion from above of a similarly-moving water-piston, a water-piston for insertion therein, the top or cap plate of which is eccentric as regards the water-piston center, substantially as set forth.

4. The combination of an annular steam-piston variably counterbalanced by variations in the areas of working surfaces subject to steam-pressure, and a water-piston variably counterbalanced by means of an eccentric cap-plate or cover, substantially as set forth.

5. A water-piston B and its plate 10, insertible from above in an opening made therefor in the steam-piston plate 6, in combination with a cap 13 for covering the same, and a telescopic joint between the cap and the steam-piston plate, substantially as set forth.

6. In a gyratory steam-pump, a steam-piston plate 6, carrying the steam-piston and having a central opening therein, in combination with a water-piston plate 10, carrying a water-piston, the two being secured together so as to have a common gyratory movement, but otherwise free to be separately counterbalanced, substantially as set forth.

In testimony whereof we have hereunto set our hands.

GEORGE D. RAND.
JOHN A. KOLLMYER.

Witnesses:
JOHN M. SELLERS,
JACOB GREMLY, Jr.